Patented June 9, 1925.

1,541,006

UNITED STATES PATENT OFFICE.

GASTON D. THEVENOT, OF NEW YORK, N. Y.

PROCESS OF MAKING VEGETABLE MILK.

No Drawing. Application filed June 11, 1923. Serial No. 644,796.

*To all whom it may concern:*

Be it known that I, GASTON D. THEVENOT, a citizen of the United States, residing at New York city, New York, have invented a certain new and useful Improvement in Processes of Making Vegetable Milk, of which the following is a clear, full, and exact description.

This invention relates to the production of vegetable milk, and more particularly to the preparation of vegetable milk from soya beans whereby a product is obtained having substantially all the constituents or ingredients of the beans from which it is produced.

In the method of preparing vegetable milk from soya beans, which has been disclosed in my Patent No. 1,444,812, a part of the beans was discarded as a by-product or waste product and was separated from that portion of the beans which was to be incorporated into the milk substitute by filtering or centrifuging the material after the beans were ground. I have now found that, by modifying the process in the manner to be disclosed, the material hitherto discarded may be incorporated into the milk product, and that all the valuable constituents of the soya bean may thus be utilized in the preparation of the vegetable milk.

It is the primary object of the present invention to provide a method of preparing vegetable milk from soya beans in which all the valuable constituents of the bean will be utilized and incorporated into the product.

Another object of the invention is to provide a substitute for ordinary cows' milk in which both the composition and the physical characteristics of the product, such as the appearance and flavor, will conform more closely than has heretofore been attained to normal cows' milk.

A further object of the invention is to improve the method of producing vegetable milk from soya beans by eliminating various steps of the process hitherto employed, thereby attaining increased economy in the process.

With these and other objects in view, the invention consists in the method hereinafter described and set forth in the claims.

The present invention is based upon the discovery that the material which was formerly discarded as a residue in the production of vegetable milk from soya beans, contains substantially the same ingredients in the same proportions as the solid matter of the vegetable milk, and may be utilized and incorporated into the vegetable milk product by means of the method hereinafter disclosed. By the use of this method various steps in the process which were formerly employed may be omitted whereby a product is obtained having more valuable properties than that heretofore produced, and whereby a saving in time and cost of production is effected. The complete utilization of the valuable ingredients of soya beans is of extreme importance commercially in order that the milk substitute may compete in price with cows' milk and may be adopted for various industrial purposes to replace cows' milk, over which the substitute material possesses certain advantages.

In the preferred form of the present invention, soya beans, or other legumes to be employed for the production of a milk substitute or vegetable milk, are first washed in order to remove adhering foreign substances. After this preliminary washing is completed, the beans are allowed to soak in water for a time in order to soften the husks, whereby the materials may be more readily ground or mashed, and whereby certain coloring materials, or other substances which would render the taste of the finished product obnoxious, are removed. The beans may be soaked in any manner desired, but the method which I have found most suitable is to first soak the beans in warm water at a temperature of approximately 50° C. for four hours. Any temperature up to the boiling point of water may be used, but it is preferable that a temperature not substantially over 50° C. be employed for the reason that various chemical changes would be liable to take place above that temperature, which would have a deleterious effect upon the finished product.

After the beans have been allowed to soak in warm water for approximately the time above mentioned, the warm water is drawn off and cold water is added, the beans being allowed to soak therein for approximately 1 to 3 hours, after which the beans will be thoroughly softened. The water is now withdrawn and grain alcohol, or specially denatured grain alcohol containing wood alcohol as a denaturing agent, is poured over the beans. The alcohol is left in contact with the beans, preferably for from 1 to 3 hours, after which time it is withdrawn. The time in which the beans are allowed to soak in alcohol may be varied to suit the conditions, and one treatment or successive treatments may be employed, as desired. The procedure which I have found preferable in practice is to treat the beans a second time with alcohol for a period of substantially 1 to 3 hours, but this repetition of the treatment with alcohol is not essential. The object of soaking the beans in alcohol is to extract from them such coloring matter and other substances which are insoluble in water and would by their presence impair the desired whiteness and flavor of the finished product. The treatment with alcohol to obtain this object may therefore be varied to obtain the maximum economy and the best results as will be obvious to those skilled in the art.

In place of grain alcohol or ethyl alcohol in the above process, I may employ some other solvent which will remove coloring matter and other undesired constituents which impair the whiteness and flavor of the finished product. A non-aqueous solvent which is miscible with water, such as acetone or any of the alcohols may, in general, be used. Methyl or wood alcohol, propyl, isopropyl and amyl alcohol, or a mixture of one or more of these could, for example, be employed. It is to be understood, however, that I prefer to use in the above process grain alcohol or a denatured alcohol which has been denatured with some agent which would not interfere with the process or leave an undesirable constituent in the final product.

After the alcohol or other solvent has been withdrawn, the beans are again allowed to soak in pure water in order to remove the remaining portions of the solvent therefrom, and after soaking for a sufficient time the water is withdrawn. After withdrawal of the soaking water, the beans are ground together with their outside husks, or with the outside husks removed to produce a smooth paste. I prefer ordinarily to remove the outside husks by any means suitable therefor, as is well known in the art, previous to the grinding operation.

During the grinding operation a small amount of water may be used, if desired, in order to produce a paste. The grinding operation is preferably carried on in a roller mill, but any apparatus which will grind the beans in toto, or completely grind them to produce a smooth impalpable pulp which will substantially completely emulsify when water is added thereto, may be used. The grinding of the beans is continued until a test shows that a suitable fineness has been attained. The stage at which the grinding should be terminated may be satisfactorily determined by placing a small amount of the paste on the tongue, which, if the beans have been sufficiently ground, will taste smooth, and no grit will be detected therein. If preferred, the fineness of grinding may be determined by taking a small amount of the paste and added water thereto to form an emulsion or suspension. If the grinding has been sufficient the bean particles will remain in suspension or in emulsion indefinitely, and no settling out of the particles will be noticeable.

After a test shows that the mass has been sufficiently ground, it is mixed with water, preferably with the aid of a stirring apparatus, to produce a complete emulsion in the water. The amount of water which is added depends upon the purpose for which the milk substitute is to be employed. If the milk substitute is to be employed in baking, it may be desired that a consistency of ordinary evaporated milk may be desired, and a corresponding amount of water will therefore be added. If a substitute milk powder is to be produced, the paste, as it comes from the roller mill, may be directly evaporated, substantially in the same manner that milk is treated for the production of milk powder. In this process I prefer to use a spray dryer because by this means the temperature of the material is not raised sufficiently high to produce an objectionable taste or flavor in the finished product. If the product which is desired is a milk substitute which will have substantially the consistency of ordinary cows' milk, the amounts of water which are added will be regulated to obtain the desired consistency.

The pasty mass resulting from the grinding or mashing process described above, contains substantially the ingredients present in cows' milk but the ingredients are not present, however, in the same proportions in which they are there present. The substitute milk or paste contains generally an excess of albuminous matter or a vegetable casein and is deficient in fats, carbohydrates and inorganic salts. These materials may be added to the ground mass from the roller mill or other grinding apparatus, either in the form of a solution or in a dry state, depending upon the consistency of the product which it is desired to produce. I prefer, in general, to incorporate these materials, or such of the materials as it is desired to add to the ground mass, by making a hot solution thereof in which the amount of water is such as to form with the paste the consistency desired, whether that of cows' milk or of evaporated milk. I have found that a satisfactory method is to employ a hot solution of the dissolved material so that on addition thereof to the paste or ground mass, a temperature of approximately 70 to 75° C. will be attained. This temperature must not be exceeded, however, for the reason that damage to the product will be likely to take place above these temperatures. A solution of carbohydrates, as sugar, and mineral matter, as lime salts, bicarbonate or carbonate of soda, sodium chloride, ammonium chloride or other ammonium salts, may be added in amounts depending upon that required to attain the desired composition in the final product.

By the incorporation of these materials into the product as described, a substitute milk product of any consistency may be obtained and of any desired composition to conform substantially with that of normal cows' milk or evaporated milk.

By the use of the term "milk" as employed in the description of the method, and in the claims, I desire to be understood to mean milk in any of its forms as of the consistency of cows' milk, evaporated or condensed milk, or milk powder, unless the context or terms employed denote otherwise. I desire also to have it understood that the term "emulsion" as used throughout the description and claims herein covers the physical form of the product obtained in the process herein described, whether the form is in fact only a suspension or whether it be a true emulsion or a combination of a suspension and an emulsion.

While the method which has been described is the preferred form of the invention, it is contemplated that various modifications may be made therein without departing from the spirit or scope of the invention as defined in the claims.

What I claim as new is:

1. A method for the preparation of vegetable milk from soya beans comprising removing from the beans the outside husks, comminuting the beans to attain a fineness whereby the comminuted material may be substantially completely suspended or emulsified in water, and adding water thereto to form a suspension or emulsion.

2. A method for the preparation of vegetable milk from soya beans comprising comminuting the beans in toto to attain a fineness whereby the material may be completely emulsified with water, adding water to the comminuted material, without filtration or other intervening steps, to form a vegetable milk.

3. A method for the preparation of a vegetable milk from soya beans comprising comminuting the beans to form a mass which will substantially emulsify with water without filtration or other intervening steps, and adding substances thereto to attain substantially the composition of cows' milk.

4. A method for the preparation of a milk substitute from soya beans, which comprises washing the beans, soaking the beans in water for a few hours, removing the water therefrom, grinding the beans in toto to an impalpable paste which will substantially completely emulsify with water, adding water thereto to emulsify the ground mass, and adding constitutents thereto in such proportions as to attain a composition substantially identical with that of cows' milk.

5. A method for the preparation of a milk substitute from soya beans, which comprises washing the beans, soaking the beans in water at a temperature of approximately 50° C. for approximately four hours, drawing off the said water, adding cold water to the beans and allowing the beans to soak therein approximately ten hours, withdrawing the water from the said beans, grinding or mashing the beans in toto to a smooth paste which will substantially completely emulsify with water, adding a solution thereto to form an emulsion or suspension of the ground mass in which the proportion of water is substantially identical with that of cows' milk and in which substances are dissolved to supply constituents to attain a composition substantially that of cows' milk.

6. A method for the preparation of a milk substitute from beans, comprising soaking the beans in water, withdrawing the water, grinding the beans to form an impalpable mass which will substantially completely emulsify on the addition of water thereto, and adding water thereto to attain an emulsion or a suspension of the consistency of cows' milk.

7. A method for the preparation of a milk substitute from soya beans which comprises comminuting the beans to form an impalpable mass, adding water thereto to form an emulsion or a suspension in which substantially all of the original constituents of the soya beans are present, and adding thereto carbohydrates and mineral matter in suitable proportions.

8. A method for the preparation of a milk substitute from soya beans, which comprises washing the beans, soaking the beans in water for a few hours, removing the water therefrom, soaking the beans in a non-aqueous solvent, removing the solvent therefrom, grinding the beans in toto to an impalpable paste, and adding water thereto to emulsify the ground mass.

9. A method for the preparation of a milk substitute from soya beans, which comprises washing the beans, soaking the beans in alcohol for a few hours, removing the alcohol therefrom, grinding the beans to an impalpable paste, and adding water thereto to emulsify said paste.

10. A method for the preparation of a milk substitute from soya beans, which comprises washing the beans, soaking the beans in grain alcohol to remove the coloring matter and other undesired constituents therefrom, separating the said alcohol from the beans, grinding the beans in toto to an impalpable paste, adding water thereto to emulsify the paste, and adding constituents thereto in the required proportions to attain a composition substantially that of cows' milk.

11. A method for the preparation of a milk substitute from soya beans, which comprises washing the beans, soaking the beans in water at a temperature of approximately 50° C., drawing off the said water, adding cold water to the beans and allowing the beans to soak therein, withdrawing the cold water from said beans, soaking the beans in grain alcohol to abstract coloring matter and other substances insoluble in water, separating the alcohol from the beans, grinding the beans to produce a smooth pulp therefrom, and adding water together with constituents to attain a milk of the desired composition.

12. A method for the preparation of a milk substitute from soya beans, which comprises soaking the beans in a non aqueous solvent, removing the solvent therefrom, grinding the beans to a smooth paste, and adding water thereto to emulsify the paste.

Signed at New York city, New York, this 8th day of June, 1923.

GASTON D. THEVENOT.